United States Patent [19]
Wada et al.

[11] Patent Number: 6,024,552
[45] Date of Patent: Feb. 15, 2000

[54] METALLIC MOLD FOR MANUFACTURING A CONNECTOR

[75] Inventors: Yasunori Wada; Hikaru Ito; Shinsuke Tsutsui; Hajime Kawase; Osamu Sasai, all of Yokkaichi, Japan

[73] Assignee: Sumitomo Wiring Systems, Ltd., Mie, Japan

[21] Appl. No.: 09/182,309

[22] Filed: Oct. 30, 1998

Related U.S. Application Data

[62] Division of application No. 08/613,660, Mar. 11, 1996, Pat. No. 5,894,661.

[30] Foreign Application Priority Data

| Mar. 15, 1995 | [JP] | Japan | 7-84816 |
| Mar. 15, 1995 | [JP] | Japan | 7-84817 |
| Mar. 15, 1995 | [JP] | Japan | 7-84818 |
| Mar. 15, 1995 | [JP] | Japan | 7-84819 |
| Mar. 15, 1995 | [JP] | Japan | 7-84820 |
| Mar. 16, 1995 | [JP] | Japan | 7-86149 |
| Mar. 16, 1995 | [JP] | Japan | 7-86150 |
| Apr. 13, 1995 | [JP] | Japan | 7-113828 |
| Apr. 13, 1995 | [JP] | Japan | 7-113829 |

[51] Int. Cl.[7] .............................................. B29C 45/16
[52] U.S. Cl. ................. 425/130; 425/577; 425/DIG. 10; 425/DIG. 58
[58] Field of Search ......................... 425/577, DIG. 10, 425/DIG. 58, 130

[56] References Cited

U.S. PATENT DOCUMENTS

| 5,359,761 | 11/1994 | Whitson et al. . |
| 5,567,184 | 10/1996 | Sasai et al. . |
| 5,647,777 | 7/1997 | Sasai et al. . |
| 5,743,761 | 4/1998 | Kawase . |
| 5,761,805 | 6/1998 | Guyer . |
| 5,780,079 | 7/1998 | Lee .......................................... 425/577 |
| 5,824,257 | 10/1998 | Dashevsky et al. ..................... 425/577 |

FOREIGN PATENT DOCUMENTS

| 0733463 | 9/1996 | European Pat. Off. . |
| 3926682 A1 | 2/1991 | Germany . |
| 9414890 | 5/1995 | Germany . |
| 57-135133 | 8/1982 | Japan . |
| 2-29011 | 6/1990 | Japan . |

*Primary Examiner*—Tim Heitbrink
*Attorney, Agent, or Firm*—Oliff & Berridge, PLC

[57] ABSTRACT

Under the condition that the stationary metallic mold and the movable metallic mold are closed, the housing is molded into a shape having the retainer insertion hole by the existence of the sliding mold. At same time, a retainer is also molded in the below portion. First, when only the rear metallic mold is opened, the core pin is withdrawn, and at the same time the sliding mold is withdrawn along the advancing and withdrawing passage in the longitudinal direction by the cam action of the angular pin, so that the molding portion is withdrawn from the retainer insertion hole. Successively, when the metallic mold is opened, the sliding mold is relatively drawn out to the front of the advancing and withdrawing passage together with the stationary metallic mold, and the advancing and withdrawing passage becomes open. Next, the auxiliary sliding mold is advanced, and the retainer held by the auxiliary sliding mold is inserted into the retainer insertion hole and temporarily assembled to the housing. Since the entire width of the retainer is supported by the auxiliary sliding mold, it is possible to insert the retainer straight into the retainer insertion hole. The finished product is protruded to the front of the movable metallic mold by the protruding pin.

9 Claims, 11 Drawing Sheets

METALLIC MOLD FOR MANUFACTURING A CONNECTOR

This is a Division of application Ser. No. 08/613,660 filed Mar. 11, 1996, now U.S. Pat. No. 5,814,661. The entire disclosure of the prior application is hereby incorporated by reference herein in its entirety.

BACKGROUND OF THE INVENTION

The present invention relates to a metallic mold for manufacturing a connector and also relates to a method for manufacturing the connector. More particularly, the present invention relates to a metallic mold for manufacturing a connector having a retainer to be attached to a connector housing from the side and also relates to a method for manufacturing the connector.

A conventional connector is well known in which a terminal fitting is engaged double when a retainer is attached to a connector housing from the side (shown in FIGS. 1 to 6). In the connector housing 1 of this connector, there is formed a cavity 3 into which a terminal fitting 2 can be inserted from the back. On a bottom face of the cavity 3, there is provided a flexible lance 4 engaged with the terminal fitting 2.

On the other hand, a retainer 5 for preventing the terminal fitting 2 from being disconnected is attached onto an upper face of the connector housing 1. Accordingly, there is formed a retainer insertion hole 6 on the upper face of the connector housing 1 in such a manner that the retainer insertion hole 6 crosses the cavity 3. As shown in FIGS. 3 and 6, the retainer 5 is provided with a protruding piece 5a to be inserted between the cavities 3 and also provided with an engaging portion 9 which protrudes in the cavity 3 and engages with a jaw portion 8 of the terminal fitting 2. Although the detail of the retainer 5 is not shown in the drawings, it can be held at two positions, one is a provisional engaging position at which the retainer 5 is inserted into the housing 1 by a small distance, and the other is a complete engaging position at which the retainer 5 is inserted into the housing 1 by a distance longer than the distance of the provisional engaging position.

Under the condition shown in FIGS. 1 and 4 in which the retainer 5 is held at the provisional engaging position, each engaging portion 9 of the retainer 5 is withdrawn upward so that the terminal fitting 2 can be attached. When the terminal fitting 2 is inserted to a normal position under the above condition, the terminal fitting 2 is primarily engaged with the lance 4. Next, when the retainer 5 is pushed to the complete engaging position as shown in FIG. 2 and 5, each engaging portion 9 of the retainer 5 is engaged with the jaw portion 8 of the terminal fitting 2, so that the retainer 5 is secondarily engaged. In this way, the terminal fitting 2 can be double engaged with the connector. This connector is temporarily assembled while the retainer 5 is held at the provisional engaging position and then transported to a site in which the terminal is inserted into the connector.

Conventionally, until the housing 1 and the retainer 5 are temporarily assembled to each other, the housing 1 and the retainer 5 are formed separately from each other, that is, they are respectively formed by different forming machines and transported to a temporarily assembling site. After that, the housing 1 and the retainer 5 are finally assembled. In this case, assembly is conducted by an automatic machine provided with a parts feeder or alternatively assembly is manually conducted by a worker.

As described above, according to the prior art, the housing 1 and retainer 5 are molded and assembled separately, and the manufacture of a temporarily assembled connector is completed through the processes of molding, transportation and assembly. When assembly is conducted by the manual operation of a worker, it is necessary to provide a different inspection process. Due to the foregoing, a large number of processes are required to complete the manufacture of the connector, so that the manufacturing cost is increased. Further, it is necessary to manage the metallic molds for each housing 1 and retainer 5, which also increases the management cost.

The present invention has been accomplished to solve the above problems. An object of the present invention is to provide a metallic mold and a method for manufacturing a connector at low cost.

According to the first aspect of the present invention, it is provided a method for manufacturing a connector, the connector comprising a connector housing in which a cavity open in the longitudinal direction is formed for the insertion of a terminal fitting, a retainer insertion hole extending from the outside into the cavity is also formed, and a retainer is inserted from the side into the retainer insertion hole so as to engage with the terminal fitting, the method for manufacturing the connector comprising the steps of: molding the connector housing and the retainer in a metallic mold in a positional condition that the retainer is opposed to the retainer insertion hole from the side; withdrawing the metallic mold between the connector housing and the retainer in the longitudinal direction in the movement process of the mold; and relatively moving the connector housing and the retainer in the transverse direction while they are being held, so as to assemble the retainer to the connector housing.

In this invention, first, the connector housing and retainer are simultaneously molded in the molding process. Next, in the mold movement process, the metallic mold for molding the connector housing is moved in the longitudinal direction in accordance with the direction of the cavity opening. When the metallic mold between the connector housing and the retainer is withdrawn, a space is formed between the connector housing and the retainer, so that the retainer is put in a condition in which the retainer is opposed to the retainer insertion hole. When the connector housing and retainer are held and moved relatively in this condition, the retainer is inserted into the retainer insertion hole. In this way, the connector can be obtained.

Further, according to the invention, the retainer insertion hole is formed when a metallic mold for molding the cavity and a metallic mold for molding a connector housing outside, which are contacted with each other, are moved in the opposite directions along the side of the connector housing, and the metallic mold is opened.

In this invention, resin is not filled in a portion where the cavity molding metallic mold comes into contact with the connector housing outside forming mold. When both metallic molds are moved in the longitudinal direction in the mold moving process, the contact portion of both metallic molds are open on the side of the connector housing, and this opening becomes the retainer insertion hole.

Furthermore, according to the first aspect of the invention, it is to provide a metallic mold for manufacturing a connector, the connector comprising a connector housing in which a cavity open in the longitudinal direction is formed for the insertion of a terminal fitting, a retainer insertion hole extending from the outside into the cavity is also formed, and a retainer is inserted from the side into the retainer insertion hole so as to engage with the terminal fitting, the metallic mold for manufacturing the connector comprising:

a molding structure capable of molding the connector housing and the retainer in a positional relation in which the retainer is opposed from the side to the retainer insertion hole; a mold moving structure for withdrawing the metallic mold between the connector housing and the retainer in the longitudinal direction; and an operating structure for assembling the retainer to the connector housing when the connector housing and the retainer are relatively moved in the transverse direction while they are being held.

In the invention, the connector housing and the retainer are simultaneously molded in one metallic mold in the molding process. In the mold opening process, the metallic mold for molding the connector housing is moved in the longitudinal direction in accordance with the cavity opening direction. When this metallic mold is withdrawn, a space is formed between the connector housing and the retainer, so that the retainer is opposed to the retainer insertion hole. When the connector housing and the retainer are relatively moved in the transverse direction while they are being held, the retainer is inserted into the retainer insertion hole, and the connector in which the connector housing and the retainer are integrated into one body can be obtained.

Moreover, according to the invention, the retainer insertion hole is formed when a cavity molding metallic mold and a connector housing outside molding metallic mold, which are opened when they are moved along the side of the connector housing in the opposite directions, are contacted with each other.

In the invention, resin is not filled in a portion where the cavity molding metallic mold comes into contact with the connector housing outside molding metallic mold. When both metallic molds are moved in the longitudinal direction in the mold opening process, the contact portion of both metallic molds is open onto the side of the connector housing, and this opening becomes the retainer insertion hole.

According to the invention described above, it is possible to conduct the molding and the assembling process of the connector housing and the retainer by one machine. Therefore, it is not necessary to provide a conveyance process in which the parts are conveyed from the molding position to the assembling position. Further, it is not necessary to conduct the assembling process separately from the molding process after conveyance.

Accordingly, as compared with a case in which assembly is conducted by an automaton, the assembling time can be shortened because the supply of parts conducted by a parts feeder is unnecessary. Further, it is unnecessary to provide two automatons respectively used for molding and assembling. Therefore, it is possible to reduce the installation space. Compared with a case in which assembly is manually conducted by a worker, it is possible to greatly reduce the assembling time when an automaton is adopted, and further it is not necessary to provide an inspection process. When the aforementioned advantages are put together, the manufacturing cost of the connector can be reduced.

Further, the metallic mold withdrawing from a space between the connector housing and the retainer is moved in the longitudinal direction in the same manner as that of the metallic mold used for molding the connector housing. Accordingly, when both metallic molds are integrally moved, the manufacturing efficiency can be enhanced.

Moreover, according to the invention, when the metallic mold for molding the retainer insertion hole is moved in the longitudinal direction, the metallic mold can be opened. Accordingly, as compared with a method in which the metallic mold for molding the retainer insertion hole is withdrawn when the metallic mold is moved toward the retainer in the transverse direction, the manufacturing process can be simplified and the manufacturing efficiency can be enhanced.

According to the second aspect of the present invention, it is provided a method for manufacturing a connector, the connector comprising a connector housing in which a cavity is formed for the insertion of a terminal fitting, and a retainer attached to the connector housing from the side, the retainer engaging with the terminal fitting so as to lock it when the retainer is attached to the connector housing, the method for manufacturing the connector comprising the steps of: closing a pair of metallic molds capable of being respectively contacted with and separated from each other in one direction while a sliding mold is interposed between the pair of metallic molds, the sliding mold being assembled to one of the pair of metallic molds so that the sliding mold can be moved in a direction intersecting to the contacting and separating direction of the pair of metallic molds; molding a housing having an insertion hole for inserting a retainer via the sliding mold and also molding a retainer located at the rear of the sliding mold in the advancing and withdrawing direction; drawing the sliding mold from the retainer insertion hole by withdrawing the sliding mold; retreating the sliding mold onto the side of an advancing and withdrawing passage in accordance with the opening operation of the mold or by the action of a drive mechanism; and inserting the retainer into the retainer insertion hole from the open passage so as to assemble the retainer in a predetermined condition.

Further, according to the invention, when the retainer is inserted from the open passage into the retainer insertion hole, the entire width of the retainer is supported.

Furthermore, according to the second aspect of the present invention, it is provided a metallic mold for manufacturing a connector, the connector comprising a connector housing in which a cavity is formed for the insertion of a terminal fitting, and a retainer attached to the connector housing from the side, the retainer engaging with a terminal fitting so as to lock it when the retainer is attached to the connector housing, the metallic mold being composed of a pair of metallic molds capable of being relatively contacted with and separated from each other in one direction, a sliding mold capable of moving along an advancing and withdrawing passage provided in a direction intersecting to the contacting and separating direction of the metallic molds being assembled to one of the pair of metallic molds, the pair of metallic molds forming a molding space when the metallic molds are closed to each other under the condition that the sliding mold is advanced, the molding space being capable of molding a housing having a retainer insertion hole into which the retainer is inserted, via the sliding mold and also capable of molding a retainer located in at the rear of the sliding mold, the pair of metallic molds comprising: a retreating means for retreating the sliding mold to the side of the advancing and withdrawing passage after the sliding mold has been withdrawn; and an insertion means for inserting the retainer molded in a retainer molding space into the retainer insertion hole of the housing by advancing the retainer along the advancing and withdrawing passage.

Moreover, the insertion means supports the entire width of the retainer to be inserted into the retainer insertion hole.

According to the above-mentioned invention, under the condition that a pair of metallic molds are closed while the sliding mold is interposed between the metallic molds, the housing is molded into a shape in which the retainer insertion hole is formed on one side, and the retainer is simultaneously molded at the rear of the sliding mold. After the sliding mold has been withdrawn along the advancing and withdrawing passage and drawn out from the retainer insertion hole, it is retreated to the side of the advancing and withdrawing passage by the retreat means. Then, the retainer passes through the open advancing and withdrawing passage and is inserted into the retainer insertion hole, so that the retainer and housing are integrally assembled into one body in a predetermined condition.

In this connection, when the entire width of the retainer is not supported, the retainer is bent by a frictional force caused in the process of insertion of the retainer into the insertion hole. Specifically, since the engaging portion 9, which protrudes to the side, comes into contact with an edge portion of the cavity 3, the protruding piece 5a, which is not supported by the insertion means, is further pushed and damaged. However, according to the present invention, since the entire width of the retainer is supported by the insertion means, even when the protruding piece collides with the edge portion of the cavity, it is not bent to the side but pressed in a perpendicular direction, so that the protruding piece can be inserted into the hole.

According to the second aspect of the present invention, when a connector is manufactured, it is possible to mold a housing and a retainer in a metallic mold, and it is also possible to assemble them to each other. Accordingly, the manufacturing work period of the connector and the manufacturing cost can be reduced. Even a wide retainer which tends to be bent easily is used, it is possible to insert the retainer straight so that it can not be damaged.

According to the third aspect of the present invention, it is provided a method of manufacturing a connector, the connector comprising a connector housing in which a cavity is formed for the insertion of a terminal fitting, and a retainer attached to the connector housing from the side, the retainer engaging with the terminal fitting so as to lock it when the retainer is attached to the connector housing, the method of manufacturing the connector comprising the steps of: closing a pair of metallic molds capable of being respectively contacted with and separated from each other in one direction while a sliding mold is interposed between the pair of metallic molds, the sliding mold being assembled to one of the pair of metallic molds so that the sliding mold can be moved in a direction intersecting to the contacting and separating direction of the pair of metallic molds; molding a housing having a through-hole for inserting a retainer via the sliding mold and also molding the retainer located in the front of the sliding mold; withdrawing the sliding mold to the back of the retainer insertion hole after the molds are opened; and assembling the connector into a predetermined condition by inserting the retainer from the front.

Under the condition that the pair of metallic molds are closed, the housing is molded into a shape in which the through-hole-shaped retainer insertion hole is formed by the existence of the sliding mold, and the retainer is also formed in the front of the housing. After the pair of molds have been opened, the sliding mold is withdrawn from the retainer insertion hole, and the retainer is inserted into the retainer insertion hole, so that the retainer and the housing are integrally assembled under a predetermined condition.

Further, according to the invention, it is to provide a metallic mold for manufacturing a connector, the connector comprising a connector housing in which a cavity is formed for the insertion of a terminal fitting, and a retainer attached to the connector housing from the side, the retainer engaging with the terminal fitting so as to lock it when the retainer is attached to the connector housing, the metallic mold being composed of a pair of metallic molds capable of being relatively contacted with and separated from each other in one direction, a sliding mold capable of moving in a direction intersecting to the contacting and separating direction of the metallic molds being assembled to one of the pair of metallic molds, the pair of metallic molds forming a molding space when the metallic molds are closed to each other under the condition that the sliding mold is advanced, the molding space being capable of molding a housing having a through-hole into which the retainer is inserted via the sliding mold and also capable of molding a retainer located in the front of the sliding mold, the pair of metallic molds comprising an insertion drive section capable of inserting the retainer into the retainer insertion hole of the connector housing from the front.

Under the condition that the pair of metallic molds are closed, the housing is molded into a shape, in which a through-hole-shaped retainer insertion hole is provided, by the existence of the sliding mold, and the retainer is also molded in the front of the housing. After the pair of metallic molds have been opened, the sliding mold is withdrawn from the retainer insertion hole, and at the same time the retainer is inserted into the retainer insertion hole from the front by the action of the insertion drive means, so that the retainer and the housing are integrally assembled to each other under a predetermined condition.

Moreover, the according to the present invention, it is provided a connector comprising: a connector housing having a cavity into which a terminal fitting is inserted; and a retainer attached to the connector housing from the side, the retainer being displaced between a provisional engaging position and a complete engagement position, the retainer engaging with the terminal fitting so as to lock it at the complete engagement position, wherein a retainer insertion hole for inserting the retainer is formed in the connector housing while it penetrates two sides of the connector housing opposed to each other.

Since the retainer insertion hole is formed while it penetrates the connector housing, for example, in the process of manufacturing the connector, while an intermediate core is provided in the metallic mold, the housing is molded in which a retainer insertion hole is formed while it penetrates the connector housing. At the same time, the retainer is formed in the front of the intermediate core. While the intermediate core is being withdrawn in the metallic mold, the retainer is inserted into the retainer insertion hole so that it can be integrally assembled at the provisional engaging position. It is possible to realize the above manufacturing means.

According to the third aspect of the present invention, when a connector is manufactured, it is possible to mold and assemble a housing and a retainer in a metallic mold. Accordingly, the manufacturing work period of the connector is shortened, so that the manufacturing cost can be reduced.

DETAILED DESCRIPTION OF THE PREFERRED EMBODIMENTS

First Embodiment

Referring to FIGS. 7 to 11, an embodiment of the present invention will be explained as follows.

Figure 1:
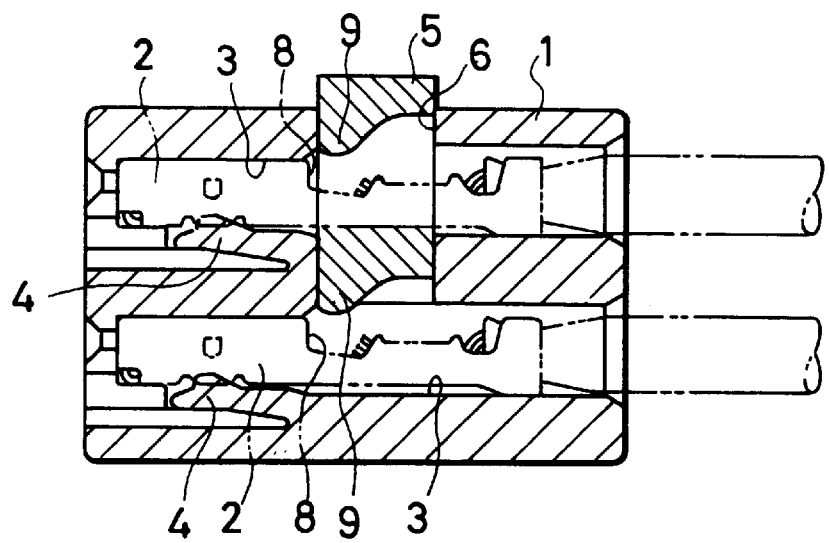
FIG. 1 is a cross-sectional view of a connector, the retainer of which is set at a provisional engaging position.
Figure 2:
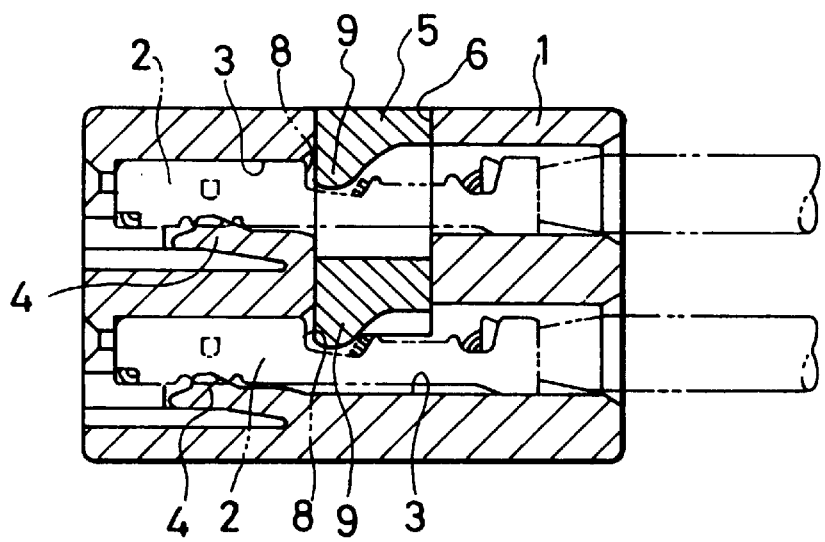
FIG. 2 is a cross-sectional view showing a condition that the retainer is set at a complete engaging position.
Figure 3:
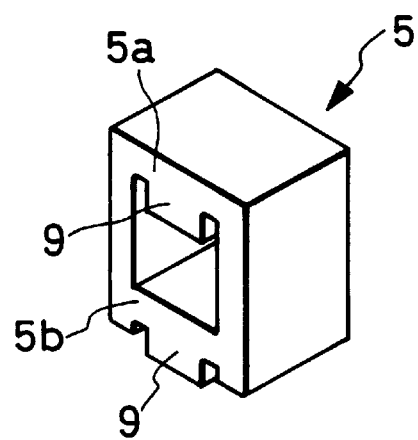
FIG. 3 is a perspective view of the retainer of FIGS. 1 and 2.
Figure 4:
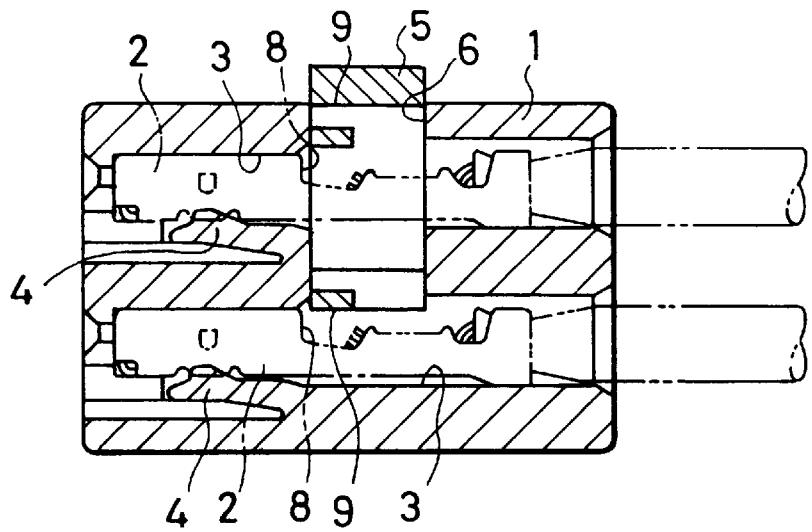
FIG. 4 is a cross-sectional view of another connector, the retainer of which is set at a provisional engaging position.
Figure 5:
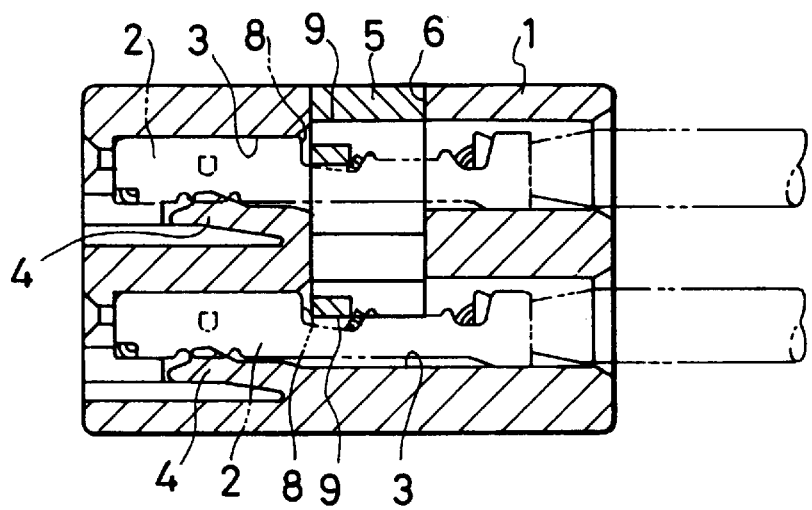
FIG. 5 is a cross-sectional view showing a condition that the retainer is set at a complete engaging position.
Figure 6:
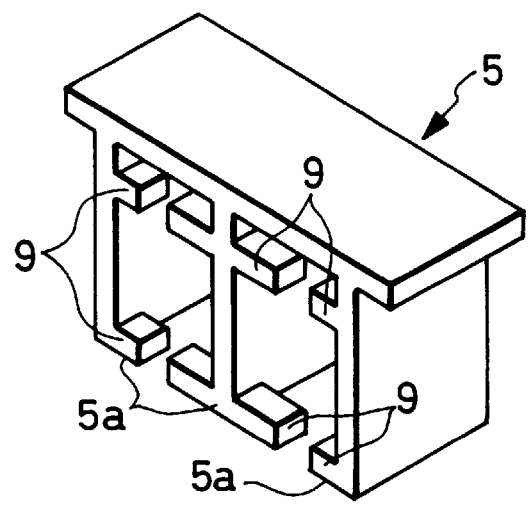
FIG. 6 is a perspective view of the retainer of FIGS. 5 and 6.
Figure 7:
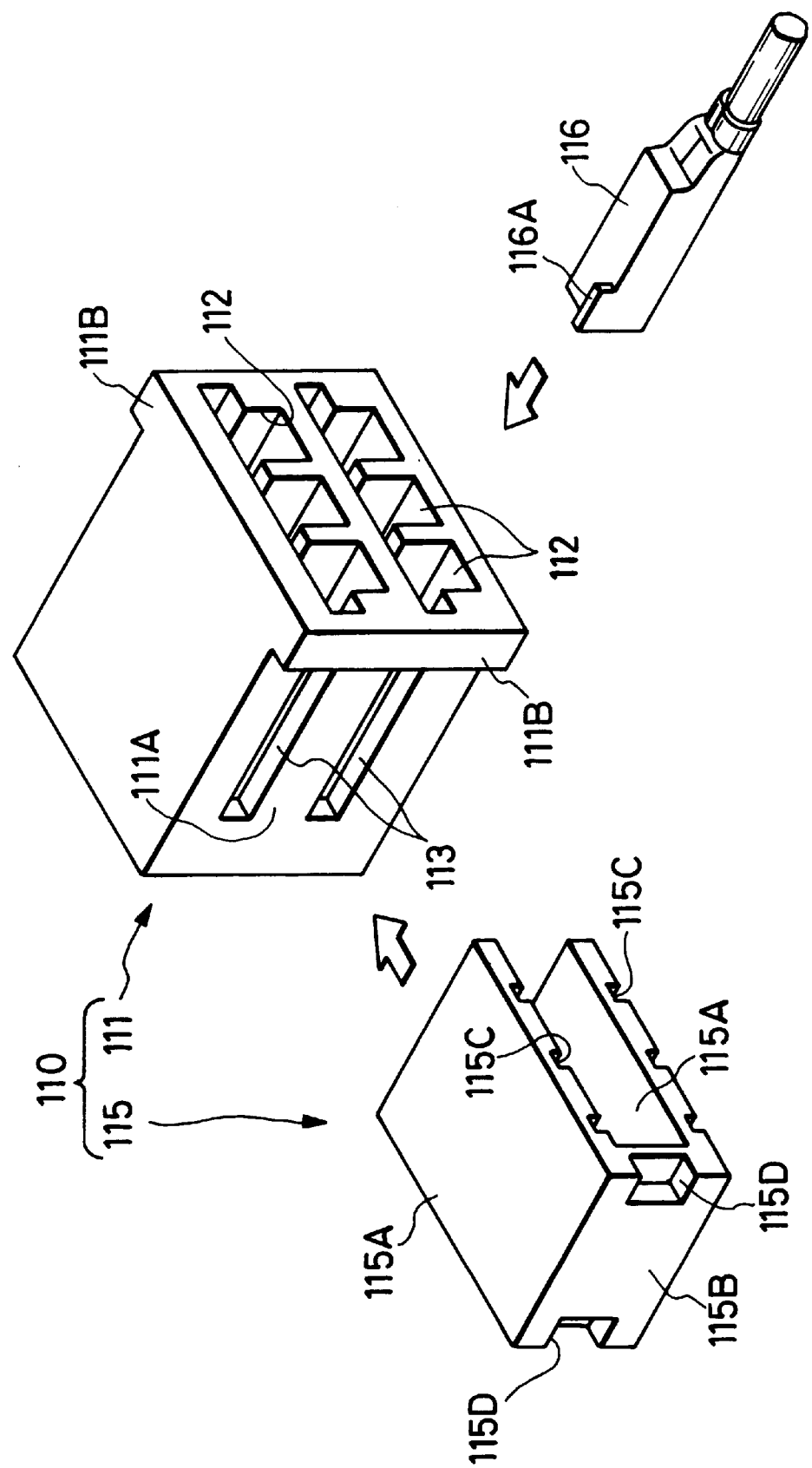
FIG. 7 is a perspective view of the connector manufactured by the metallic mold of a first embodiment of the present invention, wherein the connector is in a separate condition.

FIG. 7 is a perspective view showing a connector 110 which is molded and assembled by the manufacturing method and the manufacturing metallic mold of the embodiment of the present invention. In this embodiment, the detailed shape of the connector 110 is omitted in the following explanations.

The connector 110 is composed of a connector housing 111 and a retainer 115. In the connector housing 111, there are provided a plurality of cavities 112 which are open onto both end faces of the connector in the longitudinal direction, wherein the plurality of cavities 112 are disposed in an upper and a lower row, and three cavities are formed in each row. Further, the plurality of cavities 112 are open onto both sides of the connector housing in the transverse direction, and there are provided two retainer insertion holes 113 on each side, which communicate two cavities 112 in the upper row with two cavities 112 in the lower row. The retainer insertion holes 113 are open on the side of the connector housing 111 in such a manner that the retainer insertion holes 113 are slender in the longitudinal direction. The retainer 115 described later is inserted into the two retainer insertion holes 113 which are open onto the left side of the connector housing 11.

There are provided protrusions 111B on both outsides 111A of the connector housing 111 in the transverse direction. Front end edges of the retainer insertion holes 113 are open onto the front end faces of the protrusions 111B. Due to the above arrangement, it is possible to form the retainer insertion holes 113, which are open onto the sides of the connector housing 111, by the movable metallic mold 122 which is opened in the longitudinal direction as described later.

The retainer 115 includes: an inserting plate portion 115A, 115A composed of an upper insertion plate and a lower insertion plate which are arranged in parallel with each other; and a connecting portion 115B which connects the left end portions of both the inserting plates 115A, 115A, wherein the overall retainer 115 is formed into a C-shape. In the connecting section 115B, there are provided a pair of recesses 115D, 115D which are formed by cutting out both end portions on the outside of the connecting section 115B in the longitudinal direction. These recesses 115D correspond to the protrusions 128B, 128B of a pushing pin 128 described later. After the completion of molding, since the recesses 115D engage with the protrusions 128B, the retainer 115 is held by the pushing pin 128.

When the inserting plates 115A of the retainer 115 are inserted into the cavities 112 through the retainer insertion holes 113, the retainer 115 can be assembled at a provisional engaging position of the connector housing 111. At this provisional engaging position, the movement of the retainer 115 in the drawing direction is restricted by an engaging means (not shown in the drawing), however, when a relatively low intensity of force is given, the retainer 115 can be moved to a complete engaging position.

Figure 10:
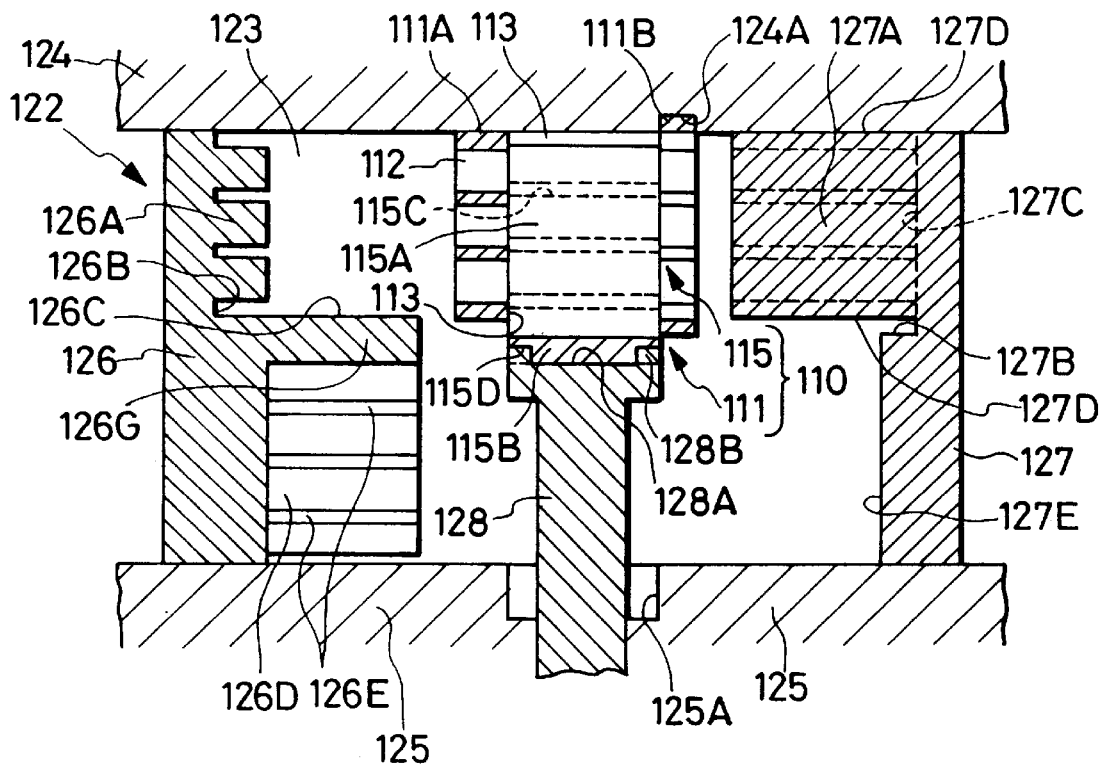
FIG. 10 is a schematic illustration showing a condition in which the retainer is assembled to the connector housing in the manufacturing process.
Figure 11:
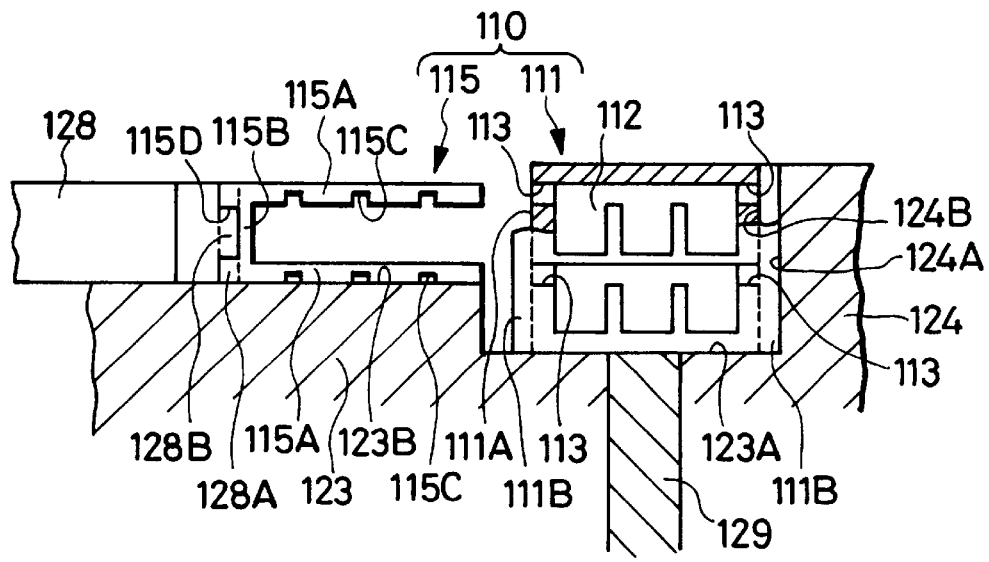
FIG. 11 is a cross-sectional view taken on line Z—Z in FIG. 9.

In a condition before the terminal fitting 116 is incorporated into the connector housing 111, the retainer 115 is assembled at the provisional engaging position (shown in FIG. 10). In this provisional engaging condition, the relief groove 115C formed on a lower face of the inserting plate portion 115A is located at a position corresponding to the engaging protrusion 116A of the terminal fitting 116. Therefore, the insertion of the terminal fitting 116 into the cavity can be allowed. When the retainer 115 is moved to the complete engaging position, the relief groove 115C is shifted from the position corresponding to the engaging protrusion 116A. Accordingly, this engaging protrusion 116A is engaged with a front edge of the inserting plate portion 116A in a locking condition. In this way, the terminal fitting 116 can be double engaged.

Next, a metallic mold to manufacture the above connector will be explained below. Detailed explanations of this metallic mold will be omitted here in the same manner as the explanations of the above connector 110.

Figure 8:
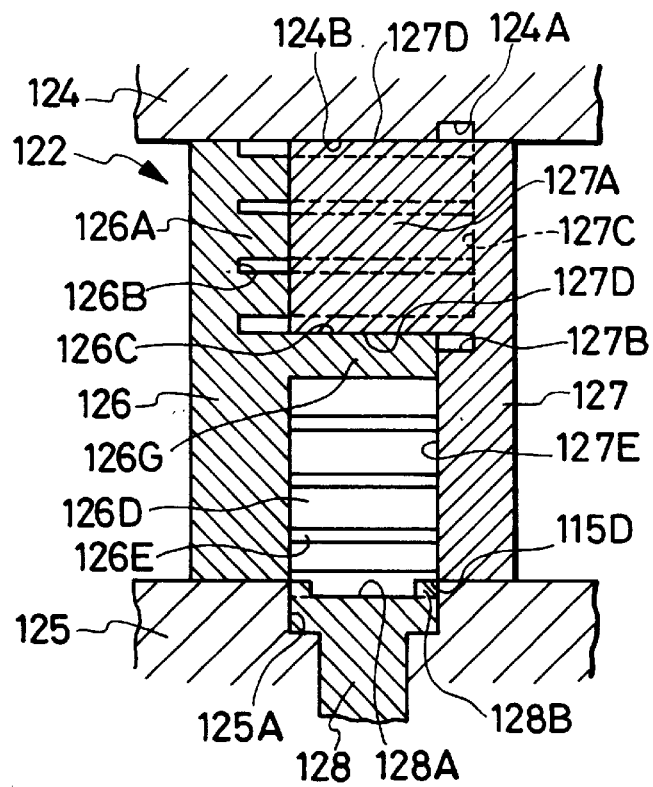
FIG. 8 is a schematic illustration showing a condition in which the movable mold is closed in the manufacturing process.
Figure 9:
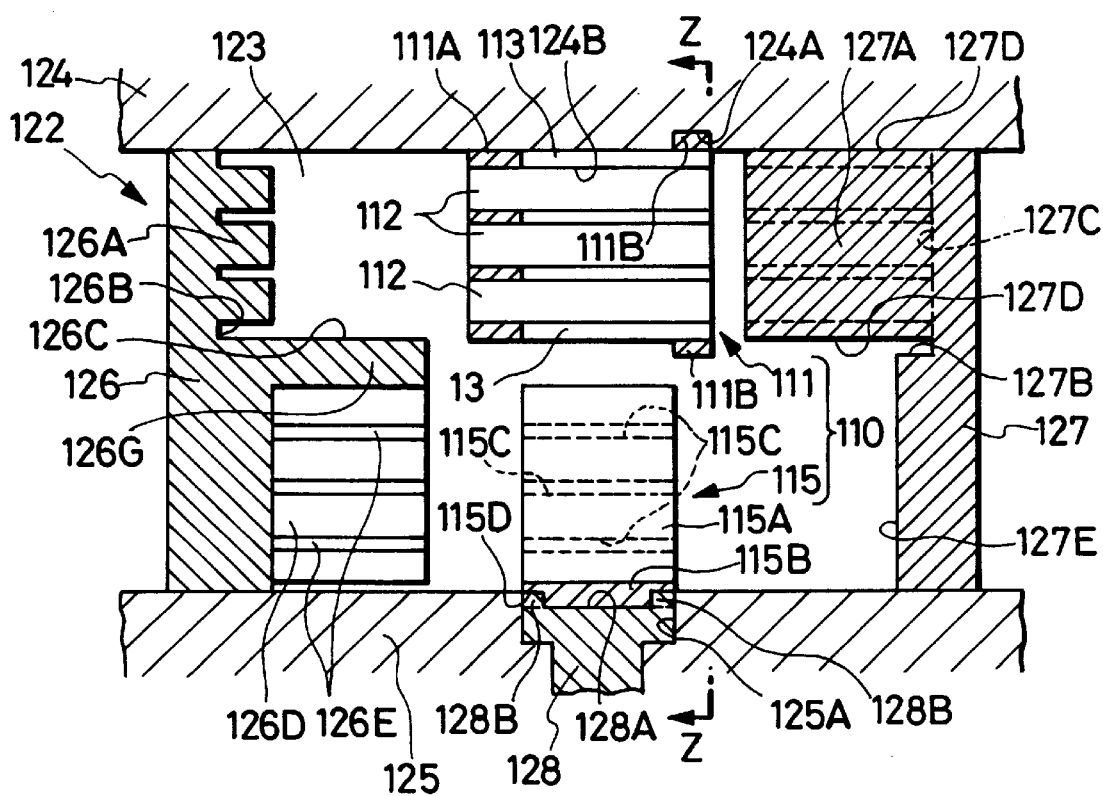
FIG. 9 is a schematic illustration showing a condition in which the movable mold is open in the manufacturing process.

The metallic mold includes: a stationary metallic mold (not shown in the drawing) that is located at a position on the viewer's side with respect to the surfaces of FIGS. 8 to 10; and a movable metallic mold 122 that is shown on the surfaces of the drawings.

The movable metallic mold 122 includes: a bottom metallic mold 123 for forming a bottom face of the connector housing 111; a right metallic mold 124 for forming a right side of the connector housing 111 while the right metallic mold 124 is integrated into the bottom metallic mold 123; a left metallic mold 125 for forming a left side of the connector housing 111; a front metallic mold 126 for forming a front end of the connector housing 111, wherein the front metallic mold 126 is capable of moving in the longitudinal direction along the right and the left metallic mold 124, 125; a rear metallic mold 127 for forming a rear end of the connector housing 111; a pushing pin 128 to move the retainer 115, which has been already molded, onto the connector housing 111 side; and a protruding pin 129 to protrude the connector 110, which has already been molded and assembled, outside the metallic mold.

On the bottom metallic mold 123, the connector housing 111 is molded in a region 123A adjacent to the right metallic mold 124, and at the same time, the retainer 115 is molded in a region 123B adjacent to the left metallic mold 125. The level of the region 123B for molding the retainer is higher than the level of the region 123A for molding the connector housing. Therefore, after the molding has been completed, the level of the inserting plate 11SA of the retainer 115 is the same as the level of the retainer insertion hole 113 (shown in FIG. 11).

The right metallic mold 124 is one of the components of the present invention and defined as a metallic mold for molding a connector housing outside. This right metallic mold 124 is provided with a recess 124A corresponding to a protrusion 111B at the right side rear portion of the connector housing 111. A face on the front side of this recess 124A is a face 124B for molding the connector housing outside by which the right retainer insertion hole 113 is molded from the outside and also the right outside 111A of the connector housing 111 including the molding region of the retainer insertion hole 113 is molded.

On the other hand, the left metallic mold 125 is provided with a recess 125A corresponding to the connecting portion 115B of the retainer 115, and an end of the pushing pin 128 faces the inside of the recess 125A. This pushing pin 128 is guided in the left metallic mold 125 in such a manner that the pushing pin 128 can be moved in the transverse direction, that is, the pushing pin 128 is capable of advancing from and withdrawing into the left metallic mold 125. An end of the pushing pin 128 is formed into a molding face 128A of the connecting portion 115B of the retainer 115. At this end of the pushing pin 128, there is provided a pair of protrusions 128B, 128B for molding the recesses 115D, 115D of the connecting portion 115B. When these protrusions 128B, 128B are engaged with the recesses 115D, the retainer 115 can be held. Although the retainer 115 is held in this way, it is released when a tension applied to the retainer in the acting direction exceeds a predetermined value.

The front metallic mold 126 is one of the component of the present invention and defined as a metallic mold for molding a connector housing outside. The front metallic mold 126 includes: a cavity molding portion 126A for molding a front end portion of the cavity 112; a connector housing front end molding face 126B for molding a front end face of the connector housing; and a connector housing outside center molding face 126C for molding the left outside 111A of the connector housing 111 and the retainer inserting hole 113 open to the left outside 111A.

The rear metallic mold 127 is one of the components of the present invention and defined as a metallic mold for molding a cavity. The rear metallic mold 127 includes: a cavity molding portion 127A for molding a center and a rear end portion of the cavity 112; a connector housing outside front portion molding face 127B for molding the left protruding portion 111B; a connector housing rear end face molding face 127C for molding a rear end face of the connector housing 111; and cavity inside molding faces 127D, 127D for molding the right and left retainer insertion holes 113 from the inside.

Also, the front metallic mold 126 has a retainer molding portion 126D located at a position interposed between the upper and the lower inserting plates 115A, 115A of the retainer 115. This retainer molding portion 126D is provided with a protrusion 126E for molding a relief groove 115C on the lower face of the inserting plate 115A. On the other hand, the rear metallic mold 127 is provided with a retainer molding face 127E for molding a rear end face of the inserting plate 115A.

Further, in the front metallic mold 126, there is provided a withdrawal portion 126G which is located between the connector housing 111 and the retainer 115 in the molding process and withdrawn from a position between the connector housing 111 and the retainer 115 to the front side so that a space can be formed between the connector housing 111 and the retainer 115.

Next, a method of manufacturing the connector 110 using the metallic mold composed as described above will be explained below.

In the beginning of the manufacturing process, as shown in FIG. 8, the front metallic mold 126 and the rear metallic mold 127 of the movable metallic mold 122 approach each other, and both end portions are closely contacted with each other. This movable metallic mold 122 approaches the stationary metallic mold, and both are closely contacted with each other. Under the above condition, spaces for molding the connector housing 111 and the retainer 115 are formed.

Under the above condition, the connector housing outside molding face 124B of the right metallic mold 124 and the cavity inside molding front metallic mold 127D on the right of the rear metallic mold 127 are closely contacted with each other in an opening region of the right retainer insertion hole 113. At the same time, the connector housing outside center molding face 126C of the front metallic mold 126 and the cavity inside molding front metallic mold 127D on the left are closely contacted with each other in an opening region of the left retainer insertion hole 113. Molten resin is filled into the thus arranged molding spaces through an injection passage (not shown in the drawing) provided in the metallic mold. When the injected resin is solidified, the metallic mold is opened.

In the metallic mold moving process, the movable metallic mold 122 is moved so that the entire movable metallic mold 122 can be separate from the stationary metallic mold, and at the same time, the front metallic mold 126 and the rear metallic mold 127 are moved in the longitudinal direction so that both metallic molds can be separate from each other. Since the protrusion 111B of the connector housing 111 is engaged with the recess 124A at this time, the protrusion 111B of the connector housing 111 can be held at the same position as that in the molding process. On the other hand, since the connecting portion 115B of the retainer 115 is engaged with the pushing pin 128, it can be held at the same position as that in the molding process. Due to the foregoing, the front metallic mold 126 and the rear metallic mold 127 are separated from the connector housing 111 and the retainer 115.

In accordance with the movement of the front metallic mold 126 and the rear metallic mold 127, the withdrawal portion 126G is withdrawn to the front, and a space is formed between the connector housing 111 and the retainer 115. Therefore, an end of the inserting plate 115A of the retainer 115 is opposed to the retainer insertion hole 113 in the transverse direction (shown in FIGS. 9 and 11).

At this time, the withdrawal portion 126G is not moved in the transverse direction but moved to the front in the longitudinal direction. Therefore, the movement of the withdrawal portion 126G is not obstructed by the connector housing 111 and the retainer 115.

After that, the pushing pin 128 is advanced. Then, the retainer 115 held by the pushing pin 128 through the engagement of the recess 115D and the protrusion 128B slides on the region 123B of the bottom metallic mold 123 and moved to the connector housing 111. Then, the inserting plates 115A, 115A of the retainer 115 are inserted into the retainer insertion holes 113, 13, so that the retainer 15 is assembled to the connector housing 111 at the provisional engaging position. In this way, the connector 110 can be provided. In the above condition, since an end of the inserting plate 115A is located inside the right outside of the connector housing 111, the end of the inserting plate 115A does not collide with the right metallic mold 124.

After the completion of assembly, the pushing pin 128 is withdrawn backward and disengaged from the retainer 115. At this time, the retainer 115 is given a tension caused by the friction between the recess 115D and the protrusion 128B. However, it is impossible for the retainer 115 to move from the provisional engaging position of the connector housing 111. Therefore, the pushing pin 128 is separated from the retainer 115 and returns into the left metallic mold 125. Then, the protruding pin 129 which faces the molding region 123A of the connector housing 111 of the bottom metallic mold 123 advances forward and protrudes the connector 110, which has already been assembled, outside the metallic mold.

As described above, the connector housing 111 and the retainer 115 are simultaneously molded in a single metallic mold including the front metallic mold 126 and the rear metallic mold 127 capable of sliding in the longitudinal direction. In the mold moving process, there is formed a space between the connector housing 111 and the retainer 115 so that both can be relatively moved in the assembling direction. While the connector housing 111 and the retainer 115 are being held by the recess 124A and the pushing pin 128, both are assembled to each other.

Due to the foregoing, unlike a case in which the molding process and the assembling process are carried out at different positions by different apparatus, it is not necessary to provide a conveyance process in which parts are conveyed from a molding position to an assembling position. Further, it is not necessary to provide an assembling process after the conveyance. Accordingly, the connector manufacturing method of the invention is advantageous in that the manufacturing efficiency is high and the manufacturing cost is low.

In this embodiment, the retainer insertion hole 113 is formed by the metallic mold which is open when it is moved not in the transverse direction but in the longitudinal direction. Accordingly, it is possible to mold the retainer 115 at a position which faces the retainer insertion hole 113. Due to the foregoing, unlike a case in which the retainer 115 is molded at a position except for the side of the connector housing 111, it is not necessary to provide a conveyance means for conveying the retainer to a position opposed to the retainer insertion hole. As a result, the metallic mold structure can be simplified.

Furthermore, according to the invention, when forming of the connector housing and the retainer, different resins in material or color may be filled in the connector forming mold and the retainer forming mold, so that the connector housing and the retainer can be made different in material or color.

It should be noted that the present invention is not limited to the specific embodiment explained above with reference to the drawings. Variations may be made by one skilled in the art without departing from the scope of the invention.

Second Embodiment

Referring to FIGS. 1 to 6 and 12 to 17, a second embodiment of the present invention will be explained below. An objective connector to be manufactured by the metallic mold and manufacturing method of this embodiment is a side-retainer type connector explained with reference to FIGS. 1 to 6. The metallic mold of this embodiment is incorporated into an injection molding system, and the primary portion of the metallic mold is described below. However, FIGS. 12 to 17 are simplified for the convenience of explanation. Therefore, FIGS. 12 to 17 do not necessarily correspond to the connector shown in FIGS. 1 to 6.

The metallic mold of the embodiment includes a stationary metallic mold 11 and a movable metallic mold 12 which are formed into a pair of metallic molds. The movable metallic mold 12 is connected to a drive mechanism not shown in the drawing and advanced and withdrawn in the transverse direction by a predetermined stroke. Therefore, the movable metallic mold 12 can be contacted with and separated from the stationary metallic mold 11. The movable metallic mold 12 is composed of a front metallic mold 13 and a rear metallic mold 14 which can be divided in the transverse direction.

On a molding face of the stationary metallic mold 11, there is provided a housing molding recess 16 for molding one end side of the connector housing 1. On the molding face of the stationary metallic mold 11, in a lower portion of the molding recess 16, there is provided a sliding mold 17, at the upper end of which a forming portion 18 for forming a retainer insertion hole 6 is provided, in such a manner that the sliding mold 17 is capable of advancing and withdrawing in the upward and downward direction. In the sliding mold 17, there is formed an oblique insertion hole 19 into which an angular pin 36 can be inserted while a clearance is formed between the insertion hole 19 and the angular pin 36. A lower end face of the sliding mold 17 is formed into an inclined face 20, the inclination angle of which is steeper than that of the insertion hole 19. On a surface to which the sliding mold 17 is attached, there is formed a relief hole 21 into which an end of the angular pin 36 is relieved.

As described before, the movable metallic mold 12 is composed of the front metallic mold 13 and the rear metallic mold 14. On the molding face of the front metallic mold 13, there is provided a housing molding recess 23 for molding the other end side of the connector housing 1, and this housing molding recess 23 is arranged corresponding to the housing molding recess 16 of the stationary metallic mold 11. On the inner face of the housing molding recess 23, there is provided a protruding pin 24 capable of advancing and withdrawing through the front and the rear metallic molds 13, 14.

Figure 17:
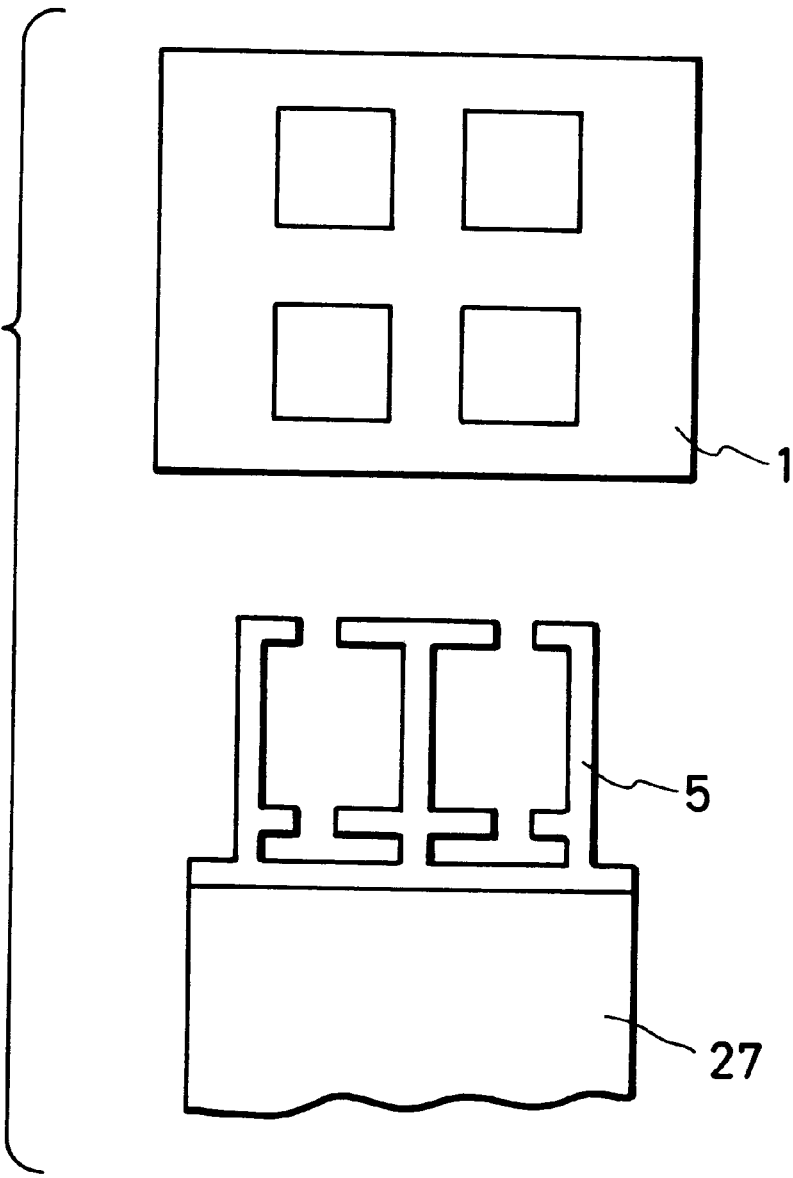
FIG. 17 is a front view showing a condition that the auxiliary sliding mold supports the retainer.

At a lower position in the drawing of the housing molding recess 23, there is provided an advancing and withdrawing passage 25 in the longitudinal direction. After the stationary metallic mold 11 and the movable metallic mold 12 have been closed, the aforementioned sliding mold 17 is inserted into the advancing and withdrawing passage 25, so that the sliding mold 17 can be slid and guided in the upward and downward direction. At a lower position of the advancing and withdrawing passage 25, there is provided an auxiliary sliding mold 27 having a retainer molding recess 28, and this auxiliary sliding mold 27 can slide freely in the upward and downward direction. This auxiliary sliding mold 27 is connected with and driven by a drive pin 29 of a cylinder drive mechanism not shown in the drawing. As shown in FIG. 17, the retainer 5 to be molded is supported by the auxiliary sliding mold 27 in the entire width direction.

In the middle of the advancing and withdrawing passage 25, there is provided an insertion hole 31 which is open to a rear face of the front metallic mold 13, wherein the insertion hole 31 makes a right angle with the rear face of the front metallic mold 13. From a front face of the rear metallic mold 14, a core pin 32 to be inserted into the insertion hole 31 is protruded. On an upper face at the end of the core pin 32, there is formed an oblique reception face 33 which agrees with the inclined face 20 of the sliding mold 17. Further, on a lower face at the end of the core pin 32, there is formed a retainer molding recess 34 composing a retainer molding space together with the retainer molding recess 28 of the auxiliary sliding mold 27.

Figure 12:
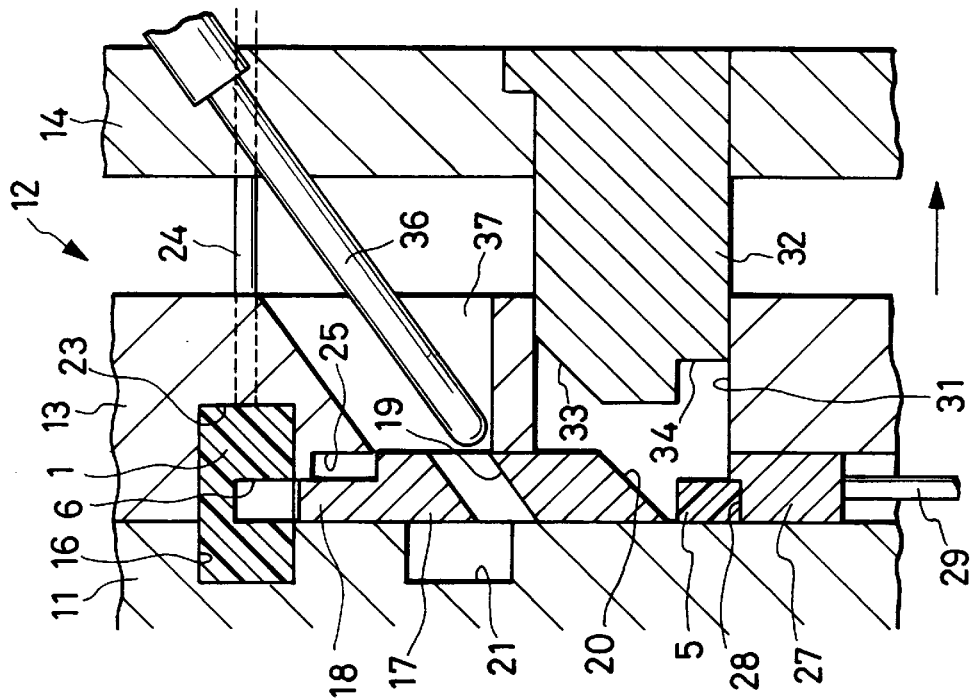
FIG. 12 is a cross-sectional view of the metallic mold of the second embodiment in a molding condition.

Under the condition that the front and the rear metallic mold 13, 14 of the movable metallic mold 12 are closed to each other, as shown in FIG. 12, the fore end of the core pin 32 passes through the insertion hole 31 and protrudes to the advancing and withdrawing passage 25, so that the sliding mold 17 can be held at an advancing position while the reception face 33 receives the inclined face 20 of the sliding mold 17. When the sliding mold 17 is located at the advancing position, the molding portion 18 of the sliding mold 17 protrudes from the lower face of the housing molding recess 23 by a predetermined distance. Since the auxiliary sliding mold 27 is pushed onto the lower face of the fore end portion of the core pin 32, a molding space for molding the retainer 5 is composed by both retainer molding recesses 28, 34. At this time, the auxiliary sliding mold 27 is located at a withdrawing position. As described later, this auxiliary sliding mold 27 passes through the advancing and withdrawing passage 25 and moves the retainer 5 to a position where the retainer 5 can be inserted into the retainer insertion hole 6 of the housing 1. This position is an advancing position of the auxiliary sliding mold 27.

From the front face of the rear metallic mold 14, there is protruded an angular pin 36 which is inclined obliquely downward by the same inclination angle as that of the insertion hole 19 of the sliding mold 17. On the rear face side of the advancing and withdrawing passage 25, there is formed a relief hole 37 which is open to the rear face of the front metallic mold 13. Under the condition that the front and the rear metallic mold 13, 14 are closed, as shown in FIG. 12, the fore end of the angular pin 36 passes through the relief hole 37 of the front metallic mold 13 and penetrates the oblique insertion hole 19 of the sliding mold 17 wherein a clearance is provided between the angular pin 36 and the oblique insertion hole 19. The fore end of the angular pin 36 protrudes into the relief hole 21 of the stationary metallic mold 11.

The following are procedures for molding the housing 1 and the retainer 5 using the metallic mold composed as described above, and also the assembling procedure for assembling the housing 1 and the retainer 5 is explained below.

FIG. 12 is a view showing a molding condition in which the front and the rear metallic mold 13, 14 of the movable mold 12 are closed, and the movable mold 12 and the stationary mold 11 are also closed. The sliding mold 17 advances to the advancing position, and the auxiliary sliding mold 27 withdraws to the withdrawing position, and the core pin 32 is inserted between both sliding molds 17, 27. The angular pin 36 passes through the relief hole 37 and penetrates the insertion hole 19 of the sliding hole 19.

Under the above condition, the respective molding spaces of the housing 1 and the retainer 5 are filled with molten resin. Due to the existence of the molding portion 18 of the sliding mold 17, the housing 1 is molded into a shape in which the retainer insertion hole 6 is open onto the upper face (the lower face in FIGS. 12 to 16). Also, the retainer 5 is molded at a lower position of the retainer insertion hole 6.

Figure 13:
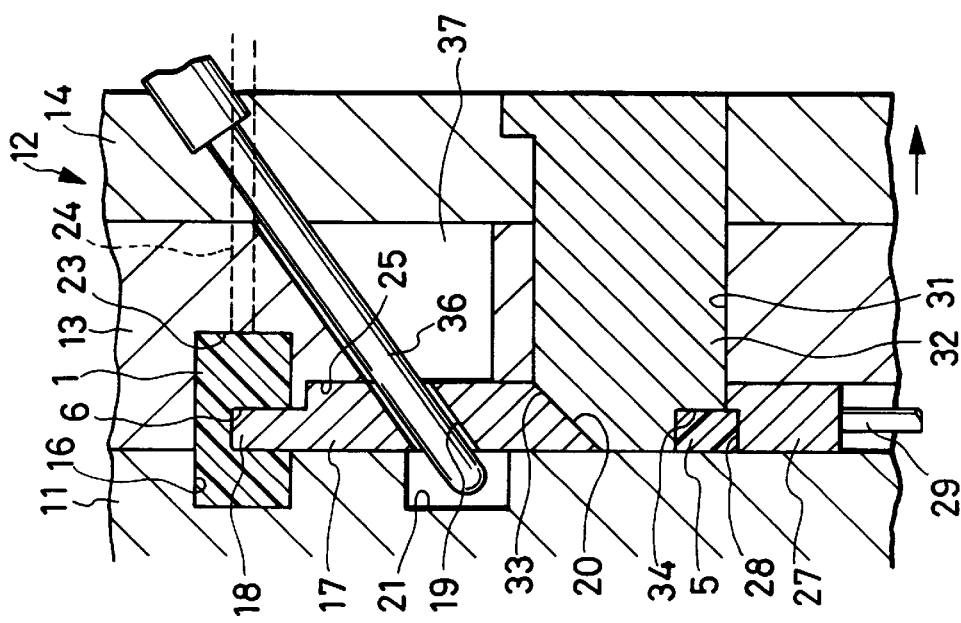
FIG. 13 is a cross-sectional view of the metallic mold in a condition that only the rear metallic mold of the movable metallic mold is opened.

After a predetermined period of time has passed, the molded resin is solidified. Then, as shown in FIG. 13, only the rear metallic mold 14 of the movable metallic mold 12 is withdrawn by a predetermined distance. In accordance with the withdrawal of the rear metallic mold 14, the core pin 32 retreats from the advancing and withdrawing passage 25, and while the fore end of the angular pin 36 is retreating, it pushes an inclined lower face of the insertion hole 19 of the sliding mold 17. Due to the cam action caused by the fore end of the angular pin 36, the sliding mold 17 is driven downward along the advancing and withdrawing passage 25. In this case, since a clearance is provided between the angular pin 36 and the lower face of the insertion hole 19, first, the core pin 32 starts retreating. Even after the sliding mold 17 has started descending by the engagement with the angular pin 36, the inclination angle of the reception face 33 of the core pin 32 is larger than that of the angular pin 36, the sliding mold 17 does not interfere with the core pin 32 but descends in the advancing and withdrawing passage 25 in such a manner that the sliding mold 17 follows the core pin 32. As shown in FIG. 13, when the angular pin 36 has passed through the insertion hole 19, the backward movement of the rear metallic mold 14 is stopped. At this time, the sliding mold 17 reaches the withdrawal position, and the molding portion 18 of the sliding mold 17 is drawn out downward from the retainer insertion hole 6.

Figure 14:
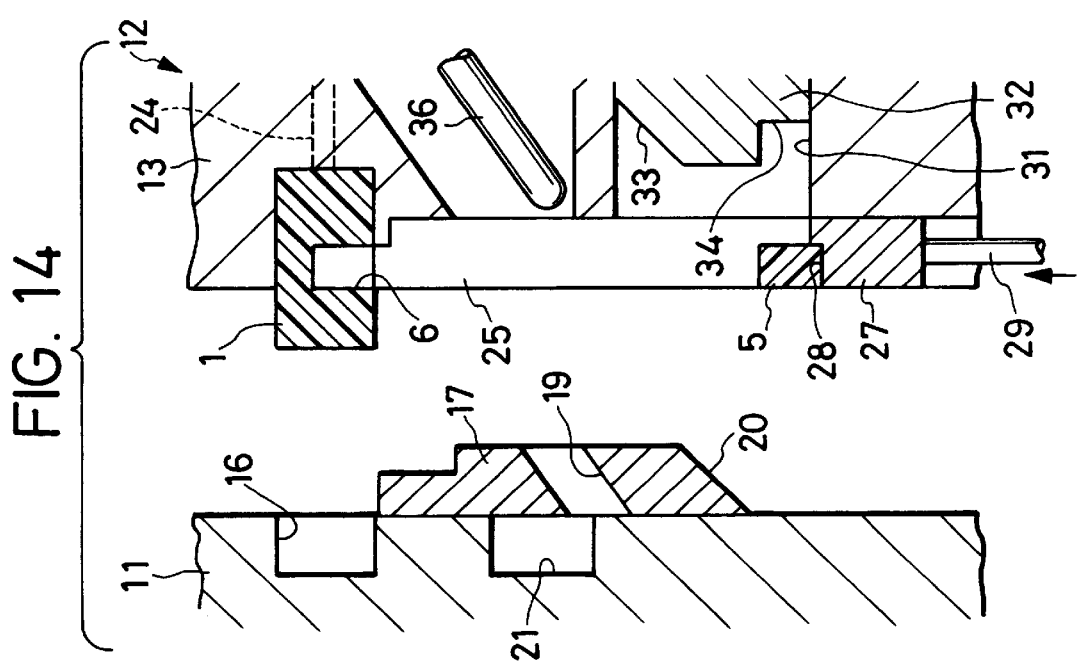
FIG. 14 is a cross-sectional view in a condition that the metallic mold is opened.

Next, as shown in FIG. 14, the entire movable metallic mold 12 is withdrawn, so that a space is formed between the stationary metallic mold 11 and the movable metallic mold 12. In accordance with that, the sliding mold 17 is drawn out to the front of the advancing and withdrawing passage 25 together with the stationary metallic mold 11. Due to the foregoing, the advancing and withdrawing passage 25 becomes open. At this time, the housing 1 is held by the front metallic mold 13 of the movable metallic mold 12, and the retainer 5 is held by the auxiliary sliding mold 27.

Figure 15:
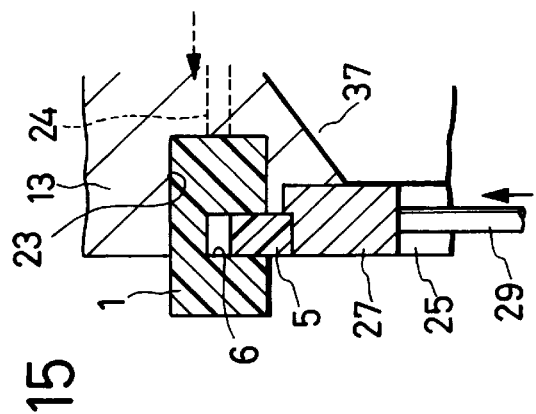
FIG. 15 is a cross-sectional view showing a condition that the retainer is assembled to the housing.

Successively, as shown in FIG. 15, the drive pin 29 advances, and the auxiliary sliding mold 27 advances along the advancing and withdrawing passage 25. The retainer 5 held by the auxiliary sliding mold 27 is inserted into the retainer insertion hole 6 from the lower side in the drawing. Due to the foregoing, the retainer 5 is assembled at the provisional engaging position.

In this case, as shown in FIG. 17, the entire width of the retainer 5 is supported by the auxiliary sliding mold 27. Consequently, a reverse side of the root portion of each protruding piece 5a comes into contact with the auxiliary sliding mold 27. Even when a frictional force is given to the protruding piece 5a when it is inserted into the insertion hole 6, the protruding piece 5a is not bent to the side but inserted in a straight condition. As a result, it is possible to prevent the protruding piece 5a from being broken in the middle portion.

In this embodiment, the auxiliary sliding mold 27 supports the entire width of the retainer 5. Substantially, it is sufficient that the entire width of the retainer 5 in which the protruding pieces 5a are formed is supported. In this meaning, the entire width in this invention indicates a width by which the protruding pieces 5a on both sides are supported from the reverse side. The retainer insertion hole 6 is a hole which is open to the side of a barrel portion of the connector housing 1. However, it should be noted that the position where the retainer insertion hole 6 is formed is not limited to the barrel portion, for example, the retainer insertion hole 6 may be formed at a recess where one face adjacent to the end portion is open. As long as the retainer 5 can be inserted into a hole-shaped recess, any shape may be adopted to the retainer insertion hole 6. A shape of the protruding piece 5a of the retainer 5 inserted into the retainer insertion hole 6 is not limited to a plate shape shown in this embodiment. As long as it tends to be bent when a force is given in an oblique direction, any member may be adopted.

Figure 16:
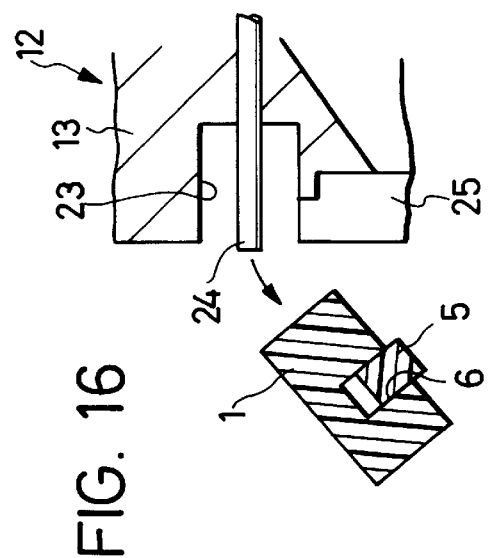
FIG. 16 is a cross-sectional view showing a condition that the finished product is taken out from the metallic mold.

After the retainer 5 has been assembled at the provisional engaging position, as shown in FIG. 16, the auxiliary sliding mold 27 is withdrawn to the withdrawal position, and the protruding pin 24 is protruded, and a product in which the retainer 5 is temporarily engaged with the housing 1 is protruded to the front of the movable metallic mold 12. In this way, the product is taken out from the metallic mold.

As described above, according to the embodiment of the present invention, it is possible to mold both the housing 1 and the retainer 5 in one metallic mold, and it also possible to temporarily assemble them at the same time. Accordingly, unlike the conventional connector, it is unnecessary to convey and assemble the parts. Therefore, the manufacturing work period can be shortened and the lead time of the product can be also shortened. As a result, it is possible to realize the reduction of the manufacturing cost. Since the different parts of the housing 1 and retainer 5 can be molded in one metallic mold, the present invention is useful from the viewpoint of managing the metallic mold. Even if a wide retainer 5 is used, it is possible to prevent the edge portion from being bent, so that the retainer 5 is not damaged.

Furthermore, according to the invention, when forming of the connector housing and the retainer, different resins in material or color may be filled in the connector forming mold and the retainer forming mold, so that the connector housing and the retainer can be made different in material or color.

It should be noted that the present invention is not limited to the specific embodiment described above with reference to the accompanying drawings. The following embodiments are included in the scope of the invention, and variations may be made by one skilled in the art without departing from the scope of the invention.

The auxiliary sliding mold 27 may be driven by a cam mechanism.

In the above embodiment, the sliding mold 17 is withdrawn from the advancing and withdrawing passage 25 in such a manner that the sliding mold 17 is provided on the stationary metallic mold 11 side and withdrawn in accordance with the opening motion of the metallic mold. However, the sliding mold 17 may be provided on the movable metallic mold 12 side and withdrawn in the transverse direction by a different drive mechanism.

Third Embodiment

Figure 18:
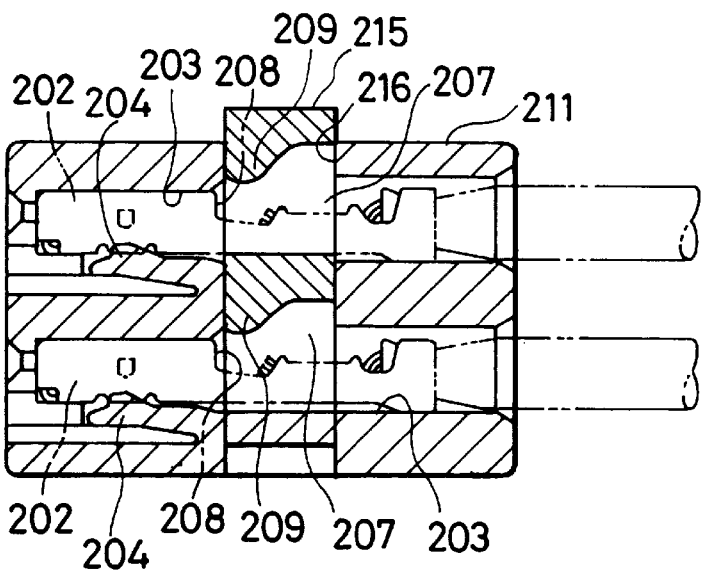
FIG. 18 is a cross-sectional view of the retainer of the connector of the third embodiment which is set at a provisional engaging position.
Figure 19:
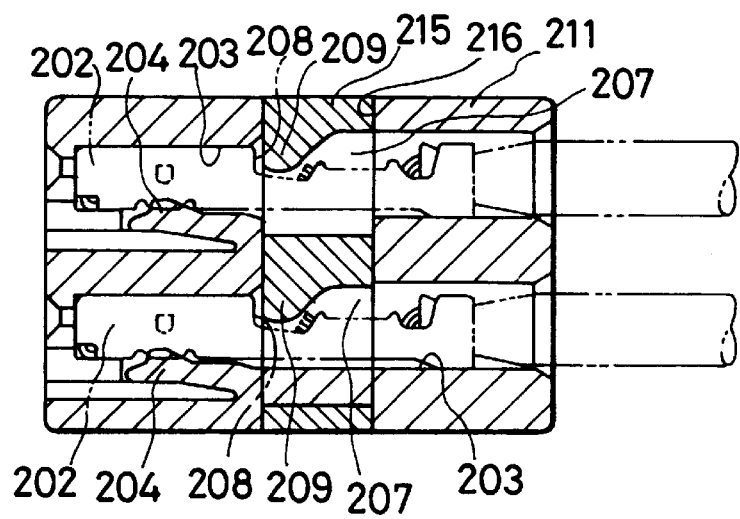
FIG. 19 is a cross-sectional view of the retainer which is set at a complete engaging position.
Figure 20:
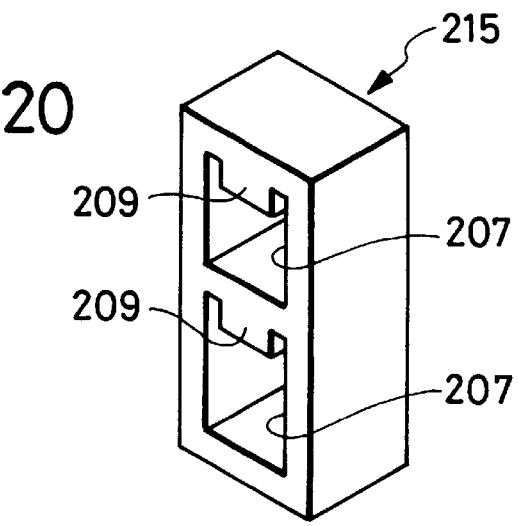
FIG. 20 is a perspective view of the retainer.
Figure 21:
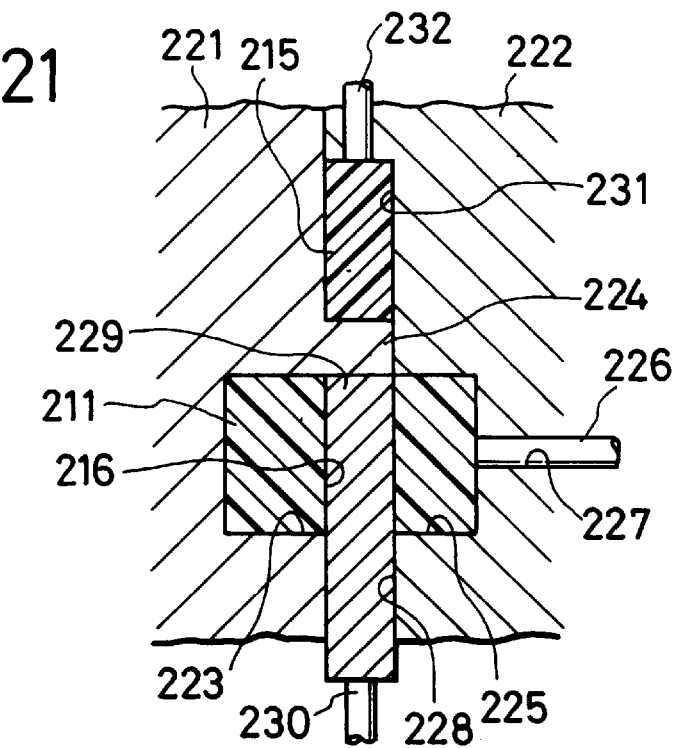
FIG. 21 is a cross-sectional view showing a molding condition of the metallic mold of the third embodiment.

Referring to FIGS. 18 to 24, a third embodiment of the present invention will be explained as follows. In this embodiment, a side retainer type connector is manufactured as shown in FIGS. 18 to 20. The essential structure and function of the connector of this embodiment are the same as those of the connector explained in the item of the conventional art with reference to FIGS. 1 and 3. Only one different point is that a retainer hole 216 provided in a connector housing 211 penetrates from the upper face to the lower face. On the other hand, as shown in FIG. 20, the height of the retainer 215 is the same as the height of the housing 211, and window holes 207 are formed in the retainer 215 in the same manner as that described before, and an engaging portion 209 is formed in each window hole 207.

The retainer 215 is incorporated into the through-hole-shaped retainer insertion hole 216 as shown in FIG. 18 and set at a provisional holding position. The terminal fitting 202 is inserted under this condition. Next, the retainer 215 is pushed to a complete engaging position as shown in FIG. 19. In this way, the terminal fitting 202 can be double engaged. Like reference characters are used to indicate like parts in the above description. Redundant explanations are omitted here.

In this case, the metallic mold for manufacturing the connector is incorporated into an injection molding system, and the essential portions are explained below, however, both the metallic mold and the connector are simplified in FIGS. 21 to 24 for the convenience of explanations.

The metallic mold of this embodiment includes a stationary metallic mold 221 and a movable metallic mold 222, which make a pair of metallic molds. On a molding face of the stationary metallic mold 221, there is provided a housing molding recess 223 by which a front portion of the connector housing 211 is formed. In the upper portion of the housing molding recess 223, there is protruded a core portion 224 for molding a lower face of the retainer 215 described later.

On the other hand, the movable metallic mold 222 is connected with a drive mechanism not shown in the drawing. Therefore, the movable metallic mold 222 is advanced and withdrawn in the transverse direction in the drawing by a predetermined stroke so that it can be contacted with and separated from the stationary metallic mold 221. On a molding face of the movable metallic mold 222, there is provided a housing molding recess 225 for molding the back of the connector housing 211 corresponding to the housing molding recess 223 of the stationary metallic mold 221. On the most inner face of this housing molding recess 225, there is provided an insertion hole 227 into which the protruding pin 226 is inserted while the protruding pin 226 can be advanced and withdrawn.

On the front side of the housing molding recess 225, there is provided a guide groove 228 in the longitudinal direction in the drawing. In the guide groove 228, there is provided a sliding mold 229 for forming a retainer insertion hole 216, wherein the sliding mold 229 can be freely slid in the upward and downward direction. This sliding mold 229 is connected with and driven by a drive pin 230 of the cylinder drive mechanism. In the process of molding, the sliding mold 229 is moved to a position at which the sliding mold 229 penetrates the front side of the housing molding recess 225, and in the process of assembling the retainer 215 described later, the sliding mold 29 is withdrawn to a position under the housing molding recess 225.

Above the sliding mold 229, there are provided a core 224 of the stationary metallic mold 221 and a retainer molding recess 231 for molding the retainer 215. The aforementioned guide groove 228 is provided being communicated with a lower face of the retainer molding recess 231. On an upper face of the retainer molding recess 231, there is provided an insertion pin 232 in such a manner that the insertion pin 232 can be freely advanced and withdrawn by a cylinder drive mechanism.

The molding and the assembling procedure of the thus composed housing 211 and retainer 215 will be explained as follows when the metallic mold composed as described above is used.

Under the condition that the sliding mold 229 advances to the front side of the housing molding recess 225, the movable metallic mold 222 advances, so that both metallic molds 221, 222 are closed to each other. At this time, the core portion 224 of the stationary metallic mold 221 crosses the guide groove 228 and enters a portion between the sliding mold 229 and the retainer molding recess 231. Under the above condition, molding spaces for the housing 211 and retainer 215 are respectively filled with molten resin. Due to the foregoing, by the existence of the sliding mold 229, it is possible to mold the housing 211 having the through-hole-shaped retainer insertion hole 216 and also it is possible to mold the retainer 215 above the housing 211.

Figure 22:
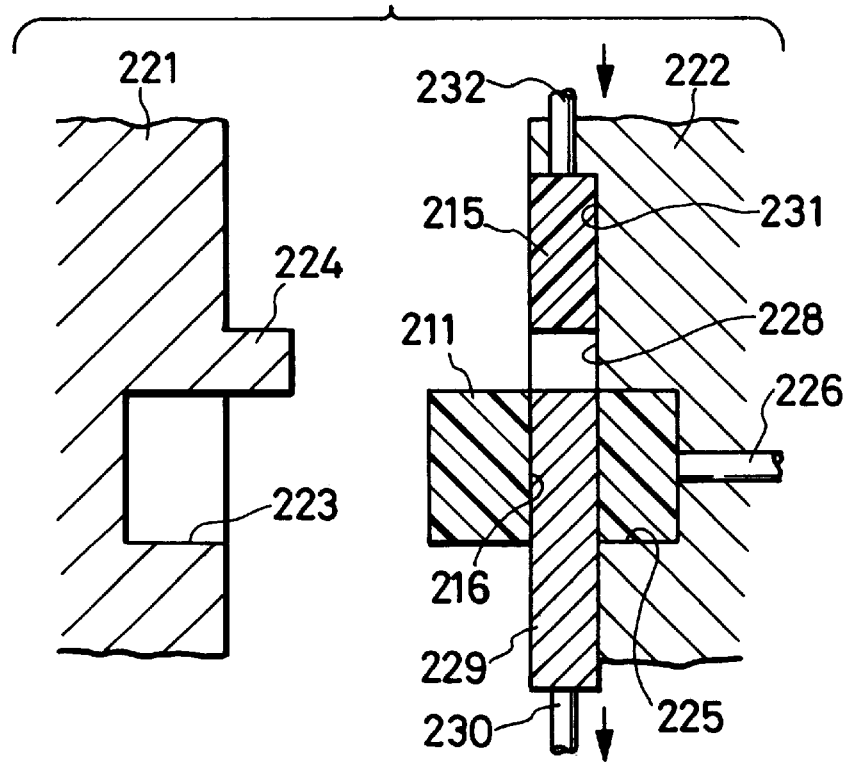
FIG. 22 is a cross-sectional view showing a condition in which the metallic mold is open.

After a predetermined period of time has passed, the molded resin is solidified. Then, the movable metallic mold 222 is withdrawn, and the metallic molds are opened as shown in FIG. 22. At this time, the molded housing 211 and retainer 215 are held by the movable metallic mold 222.

Figure 23:
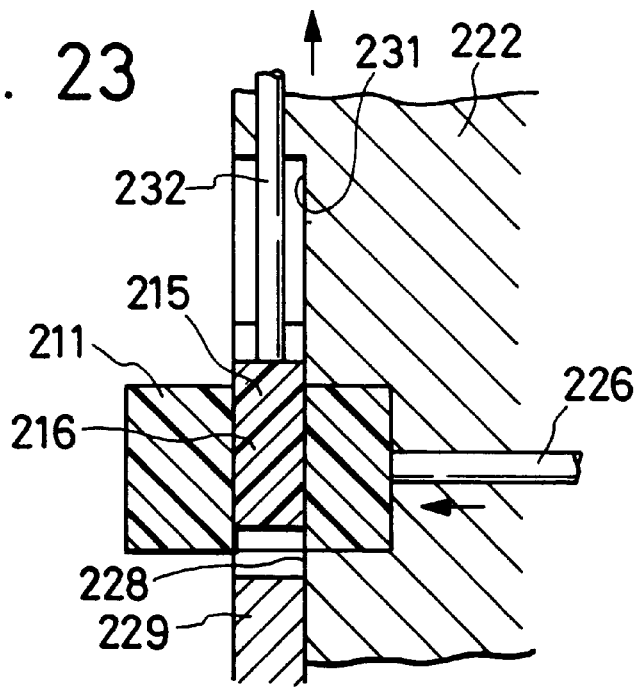
FIG. 23 is a cross-sectional view showing an assembling motion of the retainer.

Next, when the sliding mold 229 is withdrawn downward along the guide groove 228, the insertion pin 232 provided in the retainer molding recess 231 is advanced. Due to the foregoing, as shown in FIG. 23, the sliding mold 229 is withdrawn downward from the retainer insertion hole 216 of the housing 211. At the same time, the retainer 215 is inserted from an upper end of the retainer insertion hole 216. Due to the foregoing, the retainer 215 is assembled at the provisional engaging position.

Figure 24:
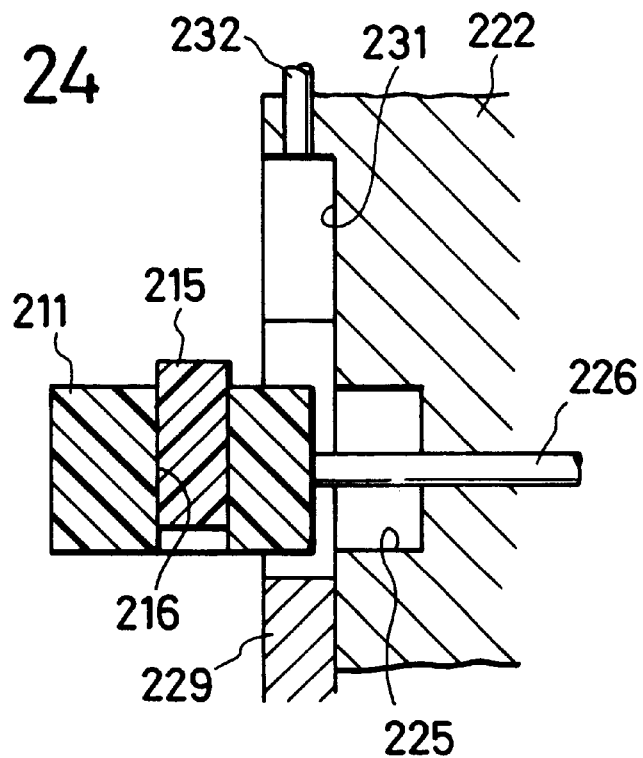
FIG. 24 is a cross-sectional view showing a condition in which a finished product is taken out from the mold.

After that, as shown in FIG. 24, the insertion pin 232 returns to the original position, and the protruding pin 226 protrudes. Therefore, a product in which the retainer 215 is temporarily engaged with the housing 211 is protruded to the front of the movable mold 222. In this way, the product can be taken out from the metallic mold.

According to the connector of this embodiment described above, the retainer insertion hole 216 is formed into a shape in which it penetrates the connector housing 211. Therefore, it is possible to realize the following manufacturing means. That is, when the sliding mold 229 is provided in the metallic mold, it is possible to mold the housing 211 in which the retainer insertion hole 216 is formed, the shape of which is like a through-hole. At the same time, it is possible to mold the retainer 215 in the front of the sliding mold 229. Therefore, while the sliding mold 229 is being withdrawn, the retainer 215 is inserted into the retainer insertion hole 216 from the front, so that the retainer 215 can be integrally assembled to the provisional engaging position.

In other words, it is possible to mold both the housing 211 and the retainer 215 and temporarily assemble them in one metallic mold. Accordingly, unlike the conventional connector, it is not necessary to conduct the operation of conveyance and assembly, so that the manufacturing work period can be reduced. Therefore, lead time of the product can be shortened and the manufacturing cost can be reduced. It is possible to mold two different moldings of the housing 211 and the retainer 215 by one metallic mold. Therefore, the present invention is useful from the viewpoint of management of the metallic mold.

Furthermore, according to the invention, when forming of the connector housing and the retainer, different resins in material or color may be filled in the connector forming mold and the retainer forming mold, so that the connector housing and the retainer can be made different in material or color.

It should be noted that the present invention is not limited to the specific embodiment explained above with reference to the drawings. For example, the technical scope of the present invention includes the following embodiments. Further, variations may be made by one skilled in the art without departing from the scope of the present invention.

For example, when the sliding mold and the retainer insertion pin are advanced and withdrawn, they may be driven by a cam mechanism.

What is claimed is:

1. A metallic mold for manufacturing a connector, said connector including a connector housing in which a cavity open in a longitudinal direction is formed for the insertion of a terminal fitting, a retainer insertion hole extending from the outside of the connector housing into the cavity is also formed, and a retainer insertable from the side into the retainer insertion hole so as to engage with the terminal fitting, the metallic mold for manufacturing the connector comprising:
a molding structure capable of molding the connector housing and the retainer in a positional relation in which the retainer is opposed from the side to the retainer insertion hole;
a mold moving structure for withdrawing the molding structure between the connector housing and the retainer in the longitudinal direction; and
an operating structure for assembling the retainer to the connector housing when the connector housing and the retainer are relatively moved in a transverse direction while the connector housing and the retainer are being held.

2. The metallic mold for manufacturing a connector as claimed in claim 1, wherein the retainer insertion hole is formed when a cavity molding metallic mold and a connector housing outside molding metallic mold, which are opened when they are moved along the side of the connector housing in opposite directions, contact each other.

3. The metallic mold for manufacturing a connector as claimed in claim 1, wherein different resins in material or color are filled in the molds for forming the connector housing and the retainer, thereby the connector housing and the retainer are made different in material or color.

4. A metallic mold for manufacturing a connector, said connector including a connector housing in which a cavity is formed for the insertion of a terminal fitting, and a retainer attached to the connector housing from the side, the retainer engaging with the terminal fitting so as to lock the terminal fitting when the retainer is attached to the connector housing, the metallic mold comprising:
- a pair of metallic molds capable of being relatively contacted with and separated from each other in one direction;
- a sliding mold capable of moving along an advancing and withdrawing passage provided in a direction intersecting the contacting and separating direction of the metallic molds and being assembled to one of the pair of metallic molds, the pair of metallic molds forming a molding space when the metallic molds are closed towards each other and the sliding mold is advanced into the molding space such that the molding space is capable of molding a housing having a retainer insertion hole into which the retainer is inserted, via the sliding mold, and also capable of molding the retainer at a rear of the sliding mold, the pair of metallic molds comprising:
- a retreating means for retreating the sliding mold to a side of the advancing and withdrawing passage after the sliding mold has been withdrawn; and
- an insertion means for inserting the retainer molded in the molding space into the retainer insertion hole of the housing by advancing the retainer along the advancing and withdrawing passage.

5. The metallic mold for manufacturing a connector as claimed in claim 4, wherein said insertion means supports an entire width of the retainer.

6. The metallic mold for manufacturing a connector as claimed in claim 4, wherein different resins in material or color are filled in the molds for forming the connector housing and the retainer, thereby the connector housing and the retainer are made different in material or color.

7. The metallic mold for manufacturing a connector as claimed in claim 6, wherein different resins in material or color are filled in the molds for forming the connector housing and the retainer, thereby the connector housing and the retainer are made different in material or color.

8. A metallic mold for manufacturing a connector, said connector including a connector housing in which a cavity is formed for the insertion of a terminal fitting, and a retainer attached to the connector housing from the side, the retainer engaging with the terminal fitting so as to lock the terminal fitting when the retainer is attached to the connector housing, the metallic mold comprising:
- a pair of metallic molds capable of being relatively contacted with and separated from each other in one direction;
- a sliding mold capable of moving in a direction intersecting the contacting and separating direction of the metallic molds and being assembled to one of the pairs of metallic molds, the pair of metallic molds forming a molding space when the metallic molds are closed towards each other and the sliding mold is advanced into the molding space such that the molding space is capable of molding a housing having a through-hole into which the retainer is inserted via the sliding mold and also capable of molding the retainer in the front of the sliding mold, wherein the pair of metallic molds comprises:
- an insertion drive section capable of inserting the retainer into the retainer insertion hole of the connector housing from the front.

9. The metallic mold for manufacturing a connector as claimed in claim 8, wherein different resins in material or color are filled in the molds for forming the connector housing and the retainer, thereby the connector housing and the retainer are made different in material or color.

* * * * *